(12) United States Patent
Kapoor et al.

(10) Patent No.: US 10,083,588 B1
(45) Date of Patent: Sep. 25, 2018

(54) VEHICLE SAFETY NOTIFICATION SYSTEM

(71) Applicants: Amit Kapoor, Rochester, MI (US); Robert M. Andres, Clarkston, MI (US); Dennis Ziesmer, Clarkston, MI (US)

(72) Inventors: Amit Kapoor, Rochester, MI (US); Robert M. Andres, Clarkston, MI (US); Dennis Ziesmer, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/641,778

(22) Filed: Jul. 5, 2017

(51) Int. Cl.
*G08B 21/00* (2006.01)
*G08B 21/04* (2006.01)
*G08B 29/18* (2006.01)

(52) U.S. Cl.
CPC ............. *G08B 21/00* (2013.01); *G08B 21/04* (2013.01); *G08B 29/18* (2013.01)

(58) Field of Classification Search
CPC .... G08B 21/00; G08B 21/04; G08B 21/0407; G08B 23/00; G08B 29/00; G08B 29/02; G08B 29/185; G08B 29/18; A01B 63/00; A01B 63/002; A01B 63/02; B60W 30/18; B60W 30/18172
See application file for complete search history.

(56) References Cited

U.S. PATENT DOCUMENTS

| 8,478,481 B2 * | 7/2013 | Igarashi | F02D 29/02 701/123 |
| 2017/0090480 A1 * | 3/2017 | Ho | G05D 1/0214 |
| 2017/0101103 A1 * | 4/2017 | Foster | B60W 30/18172 |
| 2017/0263120 A1 * | 9/2017 | Durie, Jr. | G06F 17/30823 |

* cited by examiner

*Primary Examiner* — Van Trieu

(57) ABSTRACT

A method of notifying a driver of a fault associated with a vehicle system is disclosed. The method includes receiving one or more fault signals from a vehicle system. Each fault signal includes a fault source, a fault time, and a fault description. The method includes determining a fault value associated with the received one or more fault signals. The fault value associated with a period of time or a number of events from an initial received fault signal. The method also includes executing on the computing processor a behavior system. The behavior system receives the fault signal and executes one or more behaviors from a first level of behaviors in response to the fault value being less than a first threshold value, and one or more behaviors from a second level of behaviors in response to the fault value being greater than the first threshold value.

20 Claims, 8 Drawing Sheets

VEHICLE SAFETY NOTIFICATION SYSTEM

TECHNICAL FIELD

This disclosure relates to a vehicle safety notification system.

BACKGROUND

Modern vehicles include several systems that control various vehicle functions. Generally, each system includes an electronic control unit (ECU) that monitors the associated system and determines what action(s) the system should take. Some systems are essential for the safe operation of the vehicle and the protection of the vehicle occupants. These safety systems are often complex and include many different components. In some instances, it may be possible that one or more of these components fails during the life of the vehicle. The ECU associated with each system constantly monitors the associated system for failures. In addition, the ECU is configured to record a log of the fault conditions and warn a driver of the vehicle when a fault is present by way of a warning icon. The warning typically includes an illuminated warning light, e.g., an icon, located on a dashboard of the vehicle. In most cases, the vehicle remains drivable when a fault is present, even after the driver is warned of the fault. Furthermore, depending on the type of fault, the driver may not notice any loss of operation during normal driving conditions. Since the driver does not notice any degradation in vehicle performance, the driver may be inclined to ignore the warning icon and delay the necessary repairs since vehicle repairs are typically inconvenient and costly. In cases, where the driver operates the vehicle with the faulted system(s), the vehicle may break down during operation, which causes the driver some inconvenience. The driver may be in a vehicle crash due to unrelated circumstances; however the faulted system(s) may not operate properly to protect the driver. For example, a faulted airbag system may not deploy properly in case of a vehicle crash. Therefore, it is desirable to have a vehicle notification system that better informs the driver of the severity of the warning fault, so that the driver does not ignore the warning and takes action to fix the vehicle to avoid any increased risk of injury.

SUMMARY

One aspect of the disclosure provides a method of notifying a driver of a fault associated with a vehicle system of a vehicle. The method includes receiving, at a computing processor, one or more fault signals from a vehicle system of the vehicle. Each fault signal includes a fault source that identifies the vehicle system, a fault time that identifies a time of the fault, and a fault description that provides additional information associated with the fault. The method also includes determining, by the computing processor, a fault value associated with the received one or more fault signals. The fault value indicative of a period of time or a number of events from an initial received fault signal. The method also includes executing, on the computing processor, a behavior system. The behavior system receives the fault signal and executes: one or more behaviors from a first level of behaviors in response to the fault value being less than a first threshold value, and one or more behaviors from a second level of behaviors in response to the fault value being greater than the first threshold value. The first level of behaviors provides a driver of the vehicle with a warning message or a warning sound indicative of the fault, while the second level of behaviors prevents one or more non-essential vehicle features from operation.

Implementations of the disclosure may include one or more of the following optional features. In some implementations, the method includes storing, at hardware memory in communication with the computing processer, the received fault signal. When a received fault signal is received at a first time followed by a received fault signal received at a second time, the method includes adjusting the fault value to include the received fault signal received at the second time. In some examples, the method further includes resetting the fault value associated with a received fault signal, if after a vehicle power cycle the received signal is not subsequently received.

In some implementations, when executing the one or more behaviors from the first level of behaviors, the method includes sending, from the computing processor to a user interface in communication with the computing processor, a text message configured for display on a display of the user interface. The method may also include receiving an acknowledgment from a driver by way of the user interface indicative of a confirmation of receipt of the text message.

In some examples, when executing the one or more behaviors from the first level of behaviors, the method includes sending, from the computing processor to a an audio system in communication with the computing processor, a sound signal or a text-to-speech signal configured to be outputted from one or more speakers of the audio system and indicative of a notice of the identified fault.

In some examples, the one or more behaviors from the second level of behaviors are in response to the fault value being greater than the first threshold value and less than a second threshold value being greater than the first threshold value. The second level of behaviors prevents one or more non-essential features from operation. In some examples, the one or more non-essential features include at least one of infotainment system, limitation of range of travel or speed of travel for a given key cycle, continuous audible and/or visual warning, and a wait time before a driver can shift the vehicle out of a park position.

In some implementations, the behavior system further executes: one or more behaviors from a third level of behaviors in response to the fault value being greater than the second threshold value. The third level of behaviors prevent the vehicle from being driven. The vehicle system includes at least one of a drive system, a safety system, and a sensor system. In some examples, the vehicle includes a vehicle body defining a forward drive direction, and the vehicle system is supported by the vehicle body. The vehicle system may include an electronic control unit configured to detect a fault associated with the vehicle system and transmit a fault signal to the computing processor.

In some examples, the computing processor is in communication with a user device via a network. The user device is configured to receive the one or more behaviors from the first level of behaviors in response to the fault value being less than a first threshold value.

Another aspect of the disclosure provides a vehicle notification system including hardware memory and a behavior system. The behavior system executed on a data processing device in communication with hardware memory. The behavior system: receives one or more fault signals from a vehicle system of a vehicle. Each fault signal includes a fault source identifying the vehicle system, a fault time identifying a time of the fault, and a fault description. The behavior system stores, at the hardware memory, the one or more received fault signal. The behavior system also determines a fault value associated with the one or more received fault signals. The fault value indicative of a period of time or a number of events from an initial received fault signal. The behavior system executes one or more behaviors from a first level of behaviors in response to the fault value being less than a first threshold value. The first level of behaviors provides a driver of the vehicle with a warning message or a warning sound indicative of the fault. The behavior system executes one or more behaviors from a second level of behaviors in response to the fault value being greater than the first threshold value, where the second level of behaviors prevent one or more vehicle features from operation.

Implementations of the disclosure may include one or more of the following optional features. In some implementations, the one or more behaviors from the second level of behaviors are in response to the fault value being greater than the first threshold value and less than a second threshold value being greater than the first threshold value. The second level of behaviors prevents one or more non-essential features from operation. In some examples, the one or more non-essential features include at least one of infotainment system, limitation of range of travel or speed of travel for a given key cycle, continuous audible and/or visual warning, and a wait time before a driver can shift the vehicle out of a park position. In some examples, the behavior system further executes one or more behaviors from a third level of behaviors in response to the fault value being greater than the second threshold value, where the third level of behaviors preventing the vehicle from being driven.

In some implementations, when a received fault signal is received at a first time followed by a received fault signal received at a second time, the behavior system adjusts the fault value to include the received fault signal received at the second time. The behavior system may reset the fault value associated with a received fault signal, when after a vehicle power cycle the received signal is not subsequently received.

In some examples, when executing the one or more behaviors from the first level of behavior, the behavior system sends, from the data processing device to an audio system in communication with the data processing device, a sound signal or a text-to-speech signal configured to be outputted from one or more speakers of the audio system and indicative of a notice of the identified fault.

In some implementations, the data processing device is in communication with a user device via a network. The user device configured to receive the one or more behaviors from the first level of behaviors in response to the fault value being less than the first threshold value.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
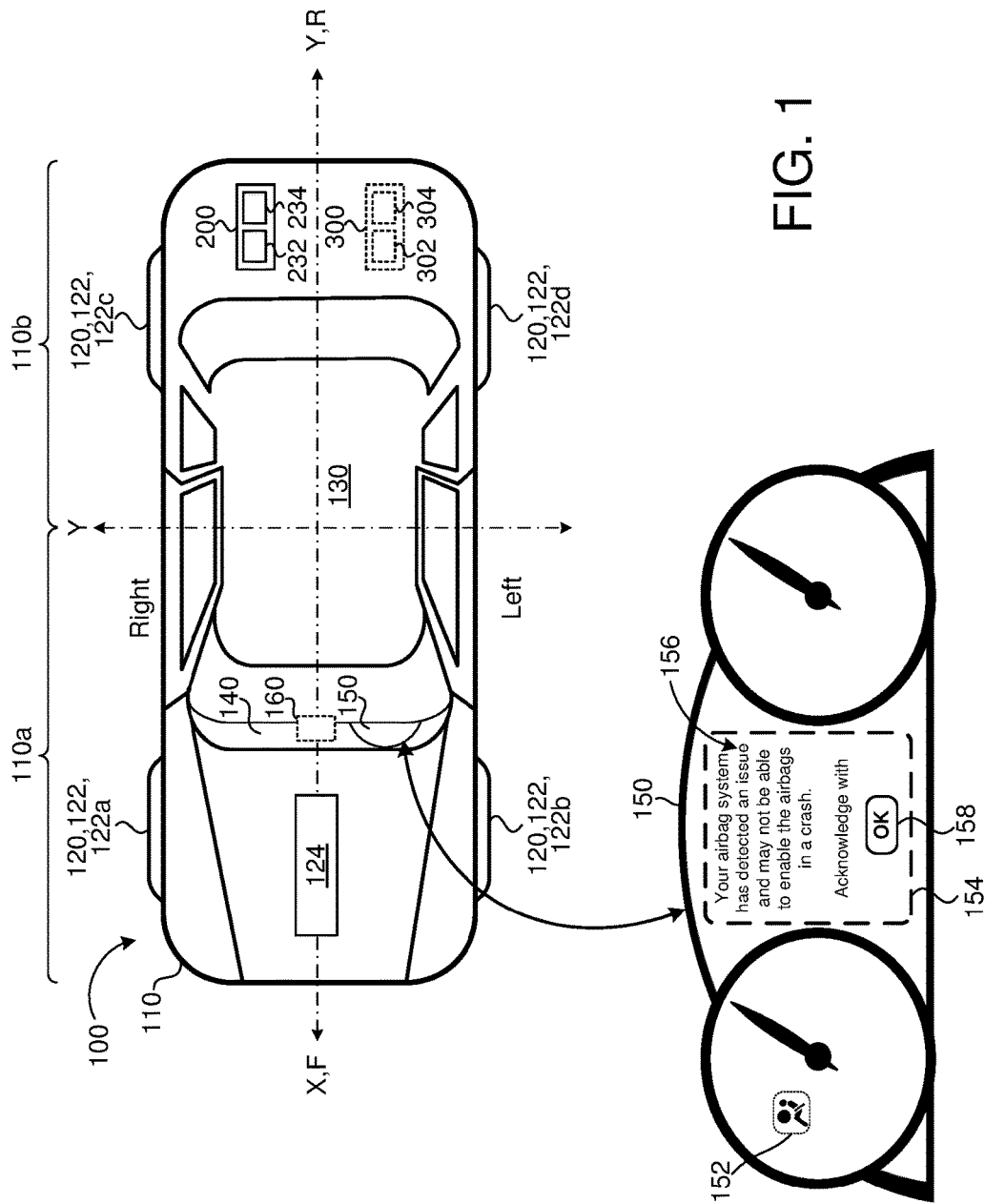
FIG. 1 is a schematic view of an exemplary vehicle notification system.

Modern vehicles include one or more systems associated with one or more features of the vehicle. Usually, when one or more features malfunction or become faulty, a status or a warning light indicator, such as an icon, is displayed on a driver display. However, since the warning light indicator fails to provide detailed information relating to the warning light indicator, it is desirable to have a vehicle safety notification system that provides information related to the warning light indicator and associated with one or more faults of the one or more vehicle systems (e.g., safety system, drive system, sensor system, to name a few) by way of a visual or audible message. As such, the additional information helps the driver understand the severity of the fault identified by the warning light indicator. When the driver is aware of the severity of the fault associated with the one or more vehicle systems, the driver may be encouraged to get the repairs needed to fix the one or more systems having the fault(s). For example, most vehicles include a restraint system that includes the vehicle seat belts and airbags. A fault condition in the restraint system may completely inhibit the restraint system, preventing the seat belts and airbags from activating and properly restraining a passenger in case of a collision or crash, which leaves the driver and vehicle occupants at a higher risk for injury. Therefore, a warning light indicator may not be enough for some drivers to understand the severity of this fault condition. Therefore, a message displayed on a user interface provides the driver with information about the fault condition in addition to the warning light indicator. The displayed message may include descriptive data on the user interface and/or an audible sound, which may lead to the driver acknowledging the fault(s).

In addition, it is desirable for the vehicle safety notification system to monitor the length of time from an initial display of a warning message, the number of times that a driver ignores a warning message, or a driving distance from the initial warning message, and based on the length of time, the number of times that the driver ignored the warning message, or the distance traveled since the warning message first appeared, the vehicle safety notification system takes one or more actions that may increase the awareness of the drive that there is a safety vehicle fault and encourage or incentivize the driver to take action and repair the vehicle sooner. For examples, if the driver ignores a warning message for a length of time greater than a threshold time or for a number of times greater than a threshold number of times, then the system may trigger one or more nonessential vehicle functions to be disabled. These non-essential functions may include, but are not limited to, the infotainment system (e.g., radio, DVD, CD, MP3, etc.) or limiting the range or speed of travel for a given key cycle, or continuous audible and/or visual warning, or wait time between starting the vehicle and being able to move the vehicle out of the "Park" position. Therefore, the longer the driver waits to repair his vehicle after a first warning message, the vehicle safety notification system takes additional measures that prevents the driver from enjoying his drive, or in some cases, prevents the driver from driving the vehicle.

Figure 2:
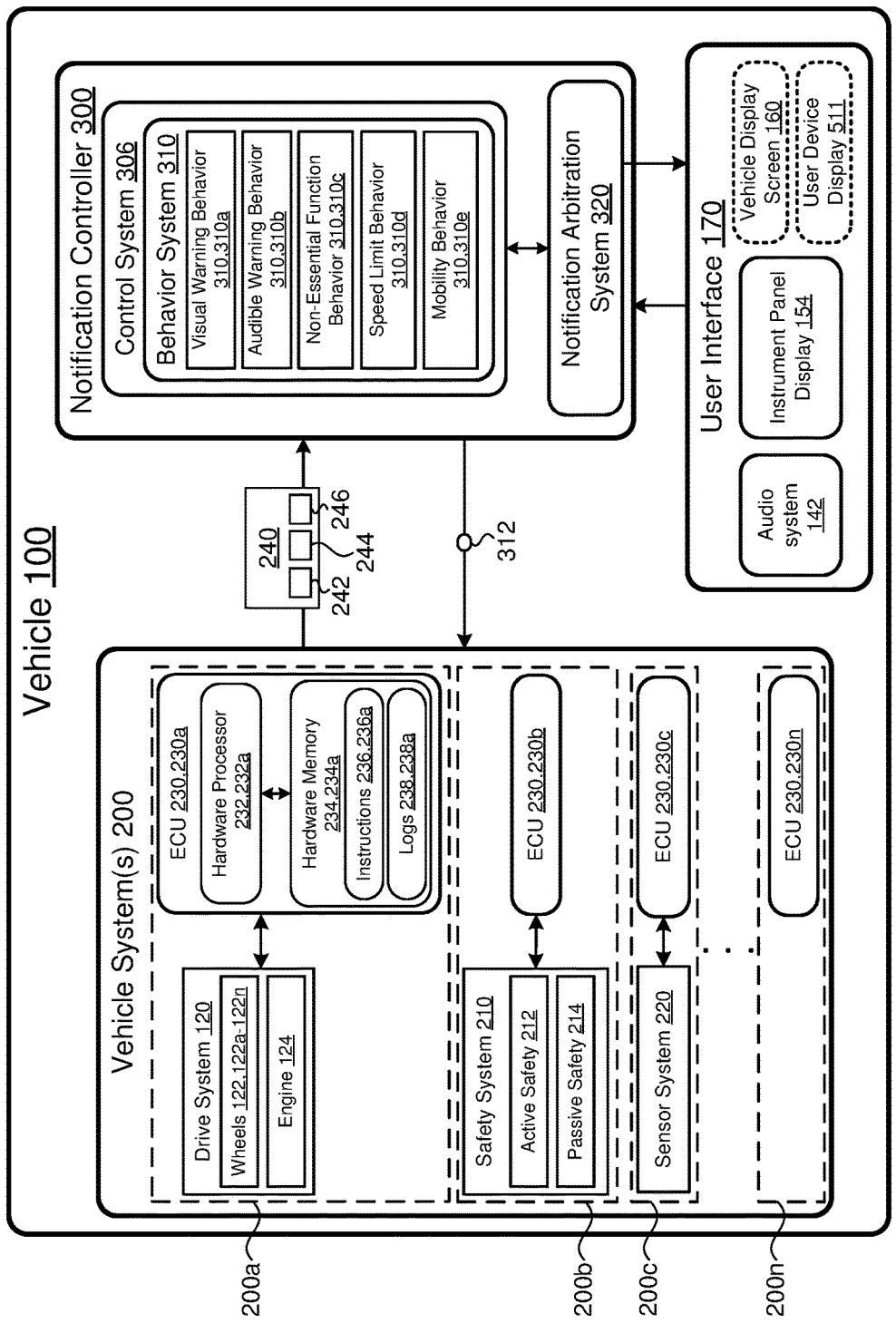
FIG. 2 is a schematic view of an exemplary vehicle with a notification controller in communication with a user interface.

Referring to FIGS. 1 and 2, in some implementations, a vehicle 100 includes a vehicle body 110 supported by a drive system 120 that allows the vehicle 100 to drive on a road surface. In some examples, the vehicle body 110 has a forward portion 110a and a rearward portion 110b. The drive system 120 includes wheels 122. For example, the drive system 120 includes forward right wheel 122, 122a, a forward left wheel 122, 122b, a rear right wheel 122, 122c, and a rear left wheel 122, 122d. The forward right wheel 122a and the forward left wheel 122b are positioned substantially opposite one another about a fort-aft axis X defined by the vehicle body 110. In addition, the rear right wheel 122c and the rear left wheel 122d are positioned substantially opposite one another about the transverse axis Y. The drive system 120 may include other wheel 122 configurations as well.

In addition, the drive system 120 includes an engine 124 that converts one form of energy into mechanical energy allowing the vehicle 100 to move. The engine 124 may be a heat engine that burns a fuel to create heat that is then used to create a force, or an electric engine that converts electrical energy into mechanical motion. Other types of engines may also be used. The drive system 120 includes other components (not shown) that are in communication with and connected to the wheels 122 and engine 124 and that allow the vehicle 100 to move.

The vehicle body 110 can move along a road through various combinations of movements relative to two perpendicular axis defined by the vehicle body 110: the fore-aft axis X and a transverse axis Y. A forward drive direction along the fore-aft axis X is designated F (sometimes referred to herinafter as "forward"), and an aft drive direction along the fore-aft axis X is designated R (sometimes referred to hereinafter as "rearward"). The transverse axis Y extends between a right side and left side of the vehicle body 110, substantially defined by center points between both the forward right wheel 122a and the forward left wheel 122b and both the rear right wheel 122c and the rear left wheel 122d.

In some examples, the vehicle 100 includes a safety system 210 that ensures the safety of the driver and passengers of the vehicle 100. The safety system 210 includes both active safety subsystems 212 and passive safety subsystems 214. Active safety subsystems 212 refers to any vehicle subsystem that helps avoid accidents, such as, but not limited to good steering and brakes, anti-lock braking system, electronic stability control, and traction control. While passive safety refers to any vehicle subsystem that helps reduce the effects of an accident, such as, but not limited to, restraint system, seat belt system, airbag system, and vehicle body structures.

In some implementations, the vehicle 100 includes a sensor system 220 that includes one or more sensors (not shown) supported by the vehicle body 110. At least one sensor is in communication with a vehicle system 200 or subsystem of the vehicle body 110, and is capable of measuring a quality of the system. For example, a seat belt sensor may be in communication with the seat belt system and monitor the health and quality of the seatbelts. The sensors may be part of the vehicle system (e.g., integrally attached) and/or external from (e.g., separate and remote from, but in communication with) the system. Sensors that are separate from the vehicle systems 200 may communicate with the vehicle systems 200 through a vehicle network (not shown), wireless communication, such as Bluetooth or Wi-Fi, wired communication, or some other form of communication.

Electronic Control Unit

Each vehicle system 200, 200a-n, i.e., the drive system 120, the safety system 210, and the sensor system 220 includes an electronic control unit (ECU) 230, 230a-n. Each ECU 230, 230a-n includes a hardware processor 232, 232a and a hardware memory 234, 234a in communication with the hardware processor 232, 232a. The hardware memory 234, 234a stores instructions 236 that when executed by the hardware processor 232, 232a cause the ECU 230 to take an action. In addition, the hardware memory 234, 234a stores logs 238 of fault conditions associated with the vehicle system 200 that it is monitoring. For example, an ECU 230 associated with the drive system 120 monitors the wheels 122 and engine 124, and when a fault in the drive system 120 occurs, the ECU 230 stores a time and description of the fault that occurred. In some examples, when the fault occurs, in addition to storing a time and description of the fault, the ECU 230 transmits the fault signal 240 including a fault identifier or source 242, the fault time 244, and fault description 246 to a notification controller 300 (described below).

Passenger Compartment

The vehicle body 110 defines a passenger compartment 130 configured to allow one or more passengers to sit in the vehicle 100 and/or allow one of the passengers to drive or semi-drive the vehicle 100 (i.e., for semi-autonomous vehicles). The vehicle 100 includes a dashboard 140 extending over a width of the passenger compartment 130 in front of one or more seats positioned in the forward portion 110a of the vehicle body 110. For example, the dashboard 140 extends over the width of the passenger compartment 130 in front of the driver and passenger seats. The dashboard 140 may include an instrument panel display 154 configured to display controls associated with the operation of the vehicle 100. The instrument panel display 154 is in communication with one or more vehicle systems 200 and receives information from the one or more vehicle systems 200 for display to the driver.

Instrument Panel

In some examples, the instrument panel 150 includes instrumentations to show speed (i.e., speedometer), a tachometer, fuel levels, oil pressure, turn signals, climate control, light-on indicator, and entertainment system among others. In addition, the instrument panel display 154 may also display warning light indicator 152, such as information light icons which are usually green, blue, or white and indicate that a system associated with the displayed warning light indicator 152 is on. The warning light indicator 152 may be a warning light icon that is usually yellow or orange and indicates that the vehicle 100 needs to be serviced or needs repairs soon. In some examples, the warning light indicator 152 is an alert light icon which is usually red and indicates that the vehicle 100 has serious or safety issues and should not be driven. Some of these warning light indicators 152 include, but are not limited to, seat belt not on, parking brake, airbag warning, engine temperature, low tire pressure, battery or alternator warning, check engine emissions warning, door open, suspension damper, traction control or ESP (electronic stability program), low oil pressure, and distance warning. As shown in FIG. 1, the displayed warning light indicator 152 is an airbag warning indicator indicating that the airbag system 200 of the vehicle 100 has an issue or fault.

User Interface for Messages

Since drivers might ignore the warning that the warning light indicator 152 provides, the vehicle 100 includes a user interface 170 that provides the driver with additional information associated with the display warning light indicator 152. The user interface 170 may include an instrument panel display 154 that is part of the instrument panel 150 (as shown) or separate from the instrument panel, for example, a Heads-Up-Display or a display screen 160 supported by the dashboard 140. The display screen 160 may be positioned in a center portion of the dashboard 140 and may be used for displaying images from a rear view camera, displaying maps for navigation, displaying vehicle and/or audio visual settings. In some examples, the user interface 170 includes a user device 510 (FIG. 4) that is in communication with the vehicle 100. The user interface may be a touch screen that allows the driver to touch the screen for interacting with the user interface 170, while in other examples, the user interface 170 is configured to receive a driver input from one or more sources, such as but not limited to, an input keyboard, a rotary dial, one or more keys on a steering wheel supported by the dashboard 140.

As shown in FIG. 1, the display warning light indicator 152 is an airbag warning icon and the displayed message 156 provides more information about the airbag display warning light indicator 152. In addition, as shown, the displayed message 156 includes an acknowledgement button 158 that allows the driver to either press the button (when the user interface 170 is a touch screen interface) or select the button 158 (by way of a physical button input, for example on the steering wheel).

Notification Controller

The vehicle 100 also includes a notification controller 300 in communication with the vehicle systems 200, 200a-n, specifically the ECUs 230, 230a-n of each vehicle system 200, 200a-n, and the user interface 170. The notification controller 300 executes a control system 306 that is configured to monitor the ECUs 230, 230a-n and when an ECU 230, 230a-n identifies a fault associated with a vehicle system 200, 200a-n, the control system 306 executes a behavior 310, 310a-e. The executed behavior causes the user interface 170 to display the message 156 associated with the fault of the vehicle system 200, 200a-n. The notification controller 300 includes a computing processor 302 (e.g., a central processing unit) in communication with non-transitory memory 304 (e.g., a hard disk, flash memory, random-access memory, to name a few). In some examples, the notification controller 300 is a stand-alone controller having its respective computing processor 302 and hardware memory 304; while in other examples, the notification controller 300 is a combination of one or more ECUs 230, 230a-n, and therefore has one or more ECU hardware processors 232, 232a-n in communication with one or more ECU non-transitory memory 234, 234a-n capable of storing instructions executable on the one or more ECU hardware processors 232, 232a-n.

The notification controller 300 includes a behavior system 310 and a notification arbitration system 320 in communication with each other. The behavior system 310 includes one or more behaviors 310a-e configured to execute and cause the user interface 170 to take action. The notification arbitration system 320 provides a prioritization mechanism between behaviors 310a-e to allow the user interface 170 to display high priority messages 156 first before displaying a low priority message 156.

When one or more ECUs 230, 230a-n identify a fault with one or more of the vehicle systems 200, 200a-n, each one of the ECUs 230, 230a-n communicates the identified fault by way of a fault signal 240 with the notification controller 300. The fault signal 240 includes a vehicle system identifier or source 242 identifying which vehicle system 200, 200a-n the fault signal 240 is associated with, a fault time 244, and a fault description 246 which identifies the type of fault. For example, a fault signal 240 may include a vehicle system identifier 244 identifying the drive system 200a to have the fault, and the fault identifier 244 may include information such the front right tire 122a has low pressure. Based on the fault data (i.e., 242, 244, 246) of the received fault signal 240, the notification controller 300 determines which one or more behaviors to execute.

In some examples, the behavior system 310 includes a visual warning behavior 310a that when executed causes the user interface 170 to display a warning message 156 as shown in FIG. 1. In some examples, the warning message 156 also includes an acknowledgment button 158 that allows the driver to acknowledge receipt of the message by interacting with the user interface 170, e.g., pressing the OK button 158 after reading the warning message 156.

The behavior system 310 may include an audible warning behavior 310b that when executed causes one or more vehicle speakers (not shown) to output a warning sound (via an audio system 142). A non-essential function behavior 310c may also be included in the behavior system 310. The non-essential function behavior 310c, when executed, causes one or more vehicle non-essential functions to stop working or to be disabled. The non-essential functions may be any vehicle function that is not primary to the movement or safe operation of the vehicle. For example, the non-essential vehicle functions may include, but are not limited to, radio function, navigation function, air conditioning functions, heated and/or cooled seats, sun roof and moon roof, limitation of range of travel or speed of travel for a given key cycle, continuous audible and/or visual warning, and a wait time before a driver can shift the vehicle out of a park position. Therefore, when the non-essential function behavior 310c is executed, then the notification controller 300 outputs a command 312 to the respective vehicle system 200 indicative of stopping a non-essential function associated with the vehicle system 200, and instructs the user interface 170 to display a message 156 informing the driver that the non-essential function will not be operating as the driver expects.

The behavior system 310 may also include a speed limit behavior 310d that when executed prevents the vehicle 100 from exceeding a specified speed. The behavior system 310 may also include a mobility behavior 310e that when executed prevents the vehicle 100 from shifting out of park, i.e., prevents the driver from driving the vehicle 100. In some examples, the mobility behavior 310e determines a location of the vehicle 100, such as a 'Home Location' and as such, the mobility behavior 310e is only executed when the vehicle is in the 'Home Location'. In other examples, the mobility behavior 310e determines a length of time that the vehicle 100 has been turned off, and the mobility behavior 310e is executed when the length of time exceeds a threshold time length, e.g., four hours.

When the behavior system 310 identifies which one or more behaviors 310a-310e to execute, the notification arbitration system 320 prioritizes the one or more behaviors based on the fault signal 240 and executes the behavior(s) 310a-310e associated with the specific fault signal 240. In some examples, the notification arbitration system 320 prioritizes the behaviors 310a-310e based on the safety associated with the fault, i.e., fault data 242, 244, 246. For example, a behavior 310a-310e executed due to a received airbag fault signal 240 is executed before a behavior 310a-310e associated with a low tire pressure fault.

Operation of the Notification Controller

Figure 3:
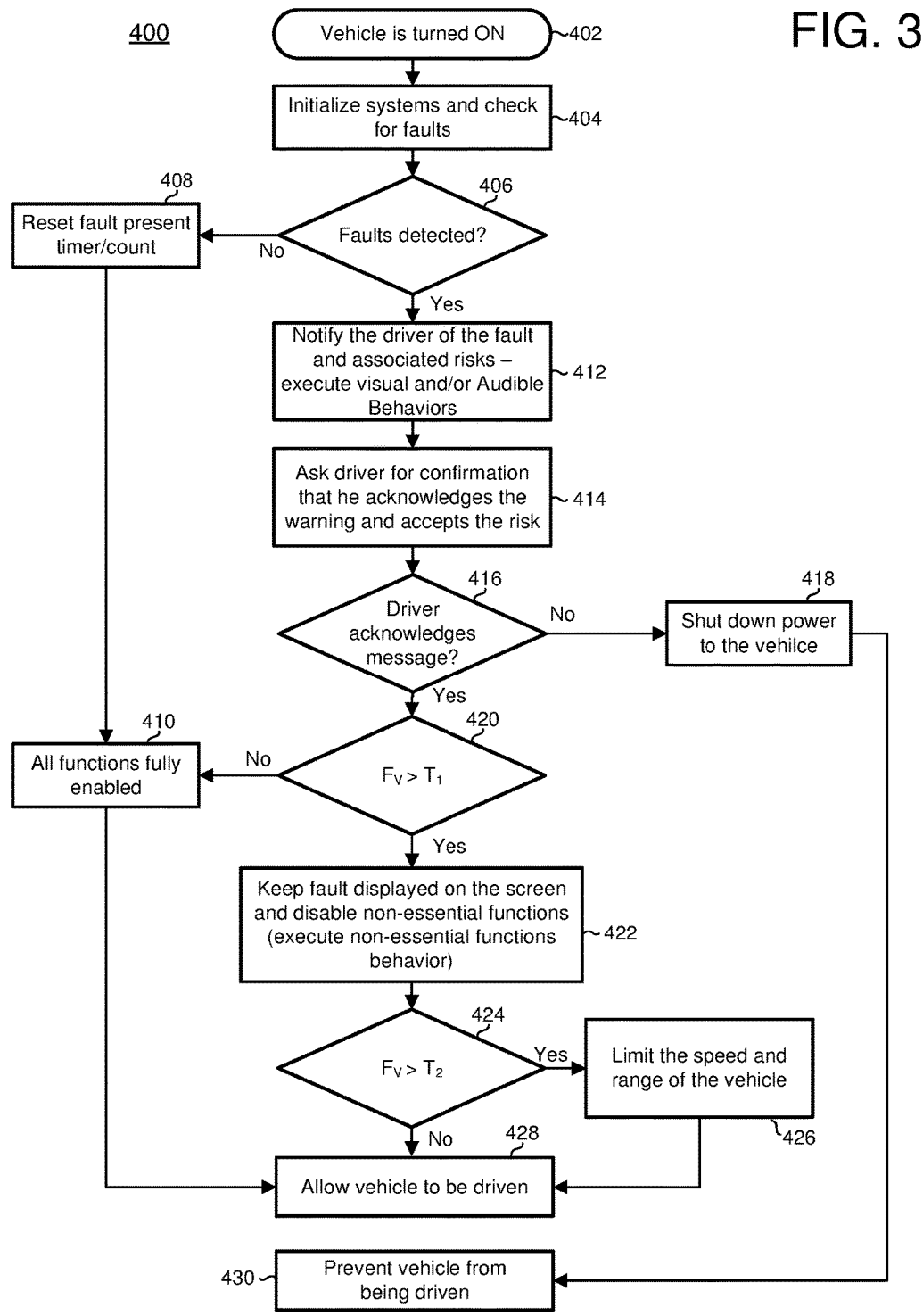
FIG. 3 is a schematic view of an exemplary block diagram for a method of notifying a driver of a vehicle fault.

FIG. 3 illustrates an exemplary block diagram 400 of operating the vehicle 100 and notifying the driver of one or more faults associated with one or more vehicle systems 200, 200a-n as described in FIGS. 1 and 2. At block 402, the vehicle 100 starts. In some examples, a driver may start the vehicle 100 while sitting inside the passenger compartment 130 or may start the vehicle 100 remotely. Once the vehicle 100 is turned on, at block 404 the vehicle systems 200, 200a-n are initialized, and each ECU 230, 230a-n associated with a vehicle system 200, 200a-n checks the associated vehicle system 200, 200a-n for one or more faults associated with the respective vehicle system 200. Once the vehicle systems 200, 200a-n have been initialized, and the ECUs 230, 230a-n have completed checking for faults, the ECUs 230, 230a-n send any fault signals 240 associated with each fault to the notification controller 300. At decision block 406, the notification controller 300 determiners if there are any received detected faults 240. In some examples, the notification controller 300 stores (on the non-transitory memory 304) a log of all detected faults, i.e., received fault signal 240, associated with each one of the vehicle systems 200, 200a-n. In addition, each log may be associated with a fault present timer/count. The present fault timer tracks each fault by storing one of the length of time from an initial display of a warning message 156, the number of times that a driver ignores a warning message 156, a driving distance from the initial warning message, or a number of key ignitions from an initial warning message 156. If at decision block 406, the notification controller 300 determines that there are no faults, then at block 408 the notification controller 300 resets the fault present timer/count. In some examples, the timer/count includes one or more timers/counts associated with each vehicle system 200, 200a-n. As such, the present fault timer/count is indicative of any fault associated with any vehicle system 200, 200a-n, and also can track the faults associated with each vehicle system 200. Once the fault timer is reset at block 408, then the vehicle 100 enables all functions at block 410 before allowing the vehicle 100 to be driven at block 428. Referring back to decision block 406, if the notification controller 300 determines that there are one or more received fault signals 240, then at block 412, the notification controller 300 executes the visual behavior 310a, the audible behavior 310b, or both the visual and audible behaviors 310a, 310b. Once the behaviors 310a, 310b are executed, then at block 414 the notification controller 300 requests that the driver acknowledges the warning message 156 provided by the behavior system 310, for example by way of the acknowledgment button 158 displayed on the user interface 170. In some examples, the driver ignores the acknowledgment button 158 and instead shifts the vehicle 100 out of park and starts driving the vehicle 100. In this case, the notification controller 300 may execute an acknowledgment behavior (not shown) that informs the driver that by driving the vehicle 100, the driver has acknowledged of the warning message 156. The acknowledgment behavior may be a message displayed on the user interface 170 and/or a voice message or a sound.

At decision block 416, if the driver does not acknowledge the warning message 156 by pressing the acknowledgment button 158, then at block 418 the notification controller 300 executes the mobility behavior 310e causing the power to be shut down from the vehicle 100, preventing the vehicle from being driven at block 430. However, referring back to decision block 416, if the driver acknowledges the message 156 and selects the acknowledgement button 158 then at decision block 420, the notification controller 300 determines a fault value $F_V$ being one of the length of time from an initial status warning indicator 152, the number of times that a driver ignores one or more display warning light indicators 152, a driving distance from the initial status indicator warning, or a number of key ignitions from the initial warning message 156. If the fault value $F_V$ is less than a first threshold $T_1$, i.e., if the fault value $F_V$ is not greater than the first threshold $T_1$, then the notification controller 300 confirms that all vehicle functions are enabled at block 410, and thus the driver may drive the vehicle 100. However, if the fault value $F_V$ is greater than the first threshold $T_1$, then at decision block 422 the notification controller 300 instructs the user interface 170 to keep displaying the warning message 156 and the notification controller 300 executes the non-essential function behavior 310c which causes one or more non-essential vehicle function to be disabled or to not operate as the driver expects.

At decision block 424, the notification controller 300 determines if the fault value $F_V$ is greater than a second threshold $T_2$ being greater than the first threshold $T_1$. If the fault value $F_V$ is greater than the second threshold $T_2$, then at block 426 the notification controller 300 executes the speed limit behavior 310d which limits the maximum speed of the vehicle 100. However, if the fault value $F_V$ is not greater than the second threshold $T_2$, then at block 428, the notification controller 300 instructs the vehicle systems 200, 200a-n, e.g., the drive system 120, that the vehicle 100 may be driven.

With continued reference to FIG. 3, the notification controller 300 provides the driver with a layered approach of notification messages 156 and behaviors 310, 310a-n. For example, the layered approach may include first, second, and third levels of notifications behaviors 310, 310a-n, where the first level of notifications 156 and behaviors 310, 310a-n are executed when the fault value $F_V$ is less than the first threshold $T_1$, while the second level of notifications 156 and behaviors 310, 310a-n are executed when the fault value $F_V$ is greater than the first threshold $T_1$ and less than the second threshold $T_2$, and the third level of notifications 156 and behaviors 310, 310a-n are executed when the fault value $F_V$ is greater than the second threshold $T_2$. As such, with each level of notifications 156 and behaviors 310, 310a-n, the executed behaviors 310, 310a-n are more severe going from displaying the message 156 in first level of notifications, to executing the non-essential function behaviors 310e in the second level, to preventing the driver from driving the vehicle 100 in the third level. As such, the notification controller 300 encourages the driver to take action when there is a warning message 156, which prevents the occurrence of the behaviors 310, 310a-n in second and third levels. In some examples, more levels of notifications may also be added.

Notification Controller in Communication with User Device and Third Party

Figure 4:
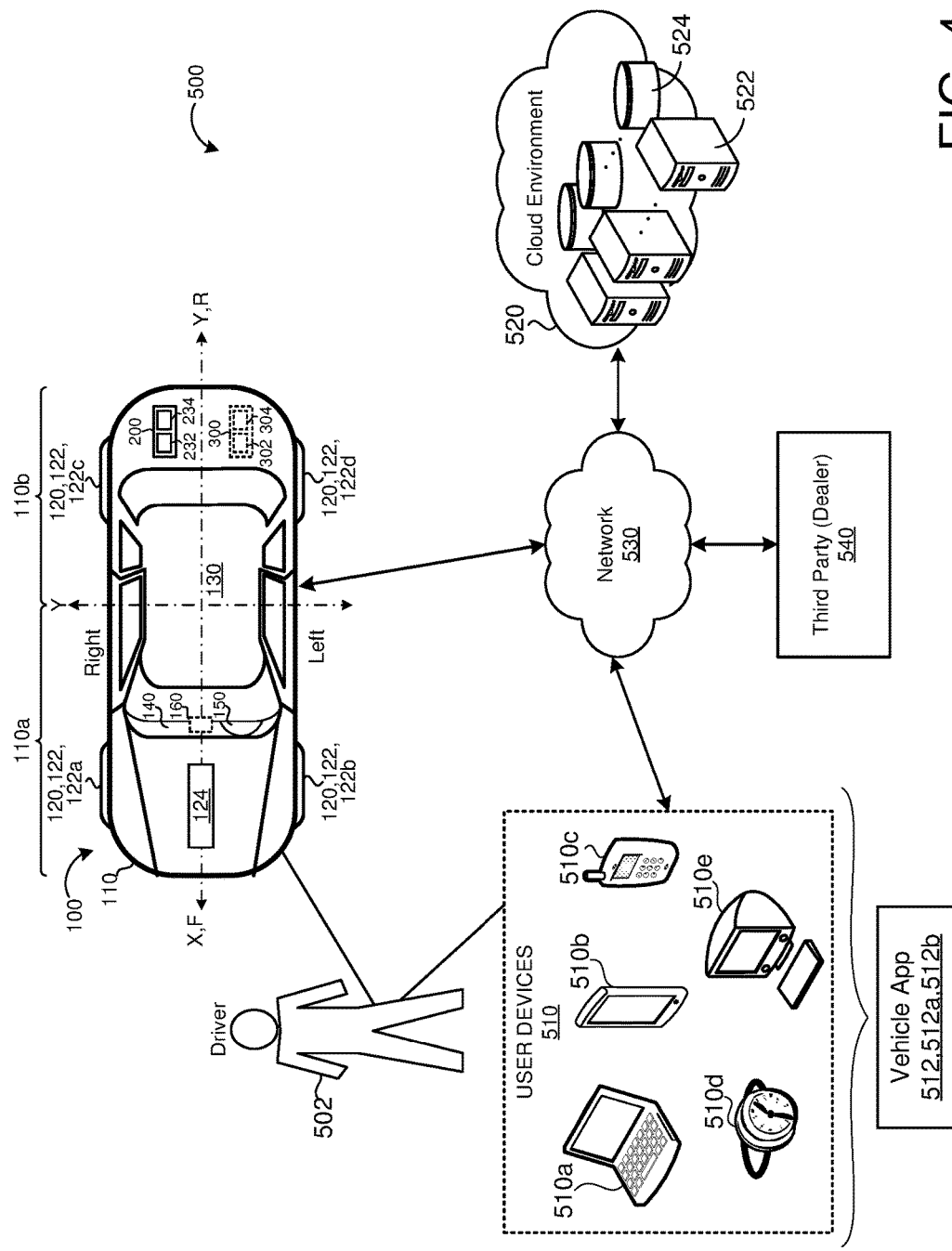
FIG. 4 is a schematic view of an exemplary vehicle notification system in communication with a user device and a third party via a network.

FIG. 4 illustrates an example vehicle notification system 500 that includes the vehicle 100 associated with a driver 502. The notification system 500 also includes a user device 510 associated with the driver 502. The vehicle 100 and the user device 510 are in communication with one another and with a remote system 520 via a network 530. The remote system 520 may be a distributed system (e.g., a cloud environment) having scalable/elastic computing resources 522 and/or storage resources 524. The network 530 may include various types of networks, such as a local area network (LAN), wide area network (WAN), and/or the Internet.

Figure 5:
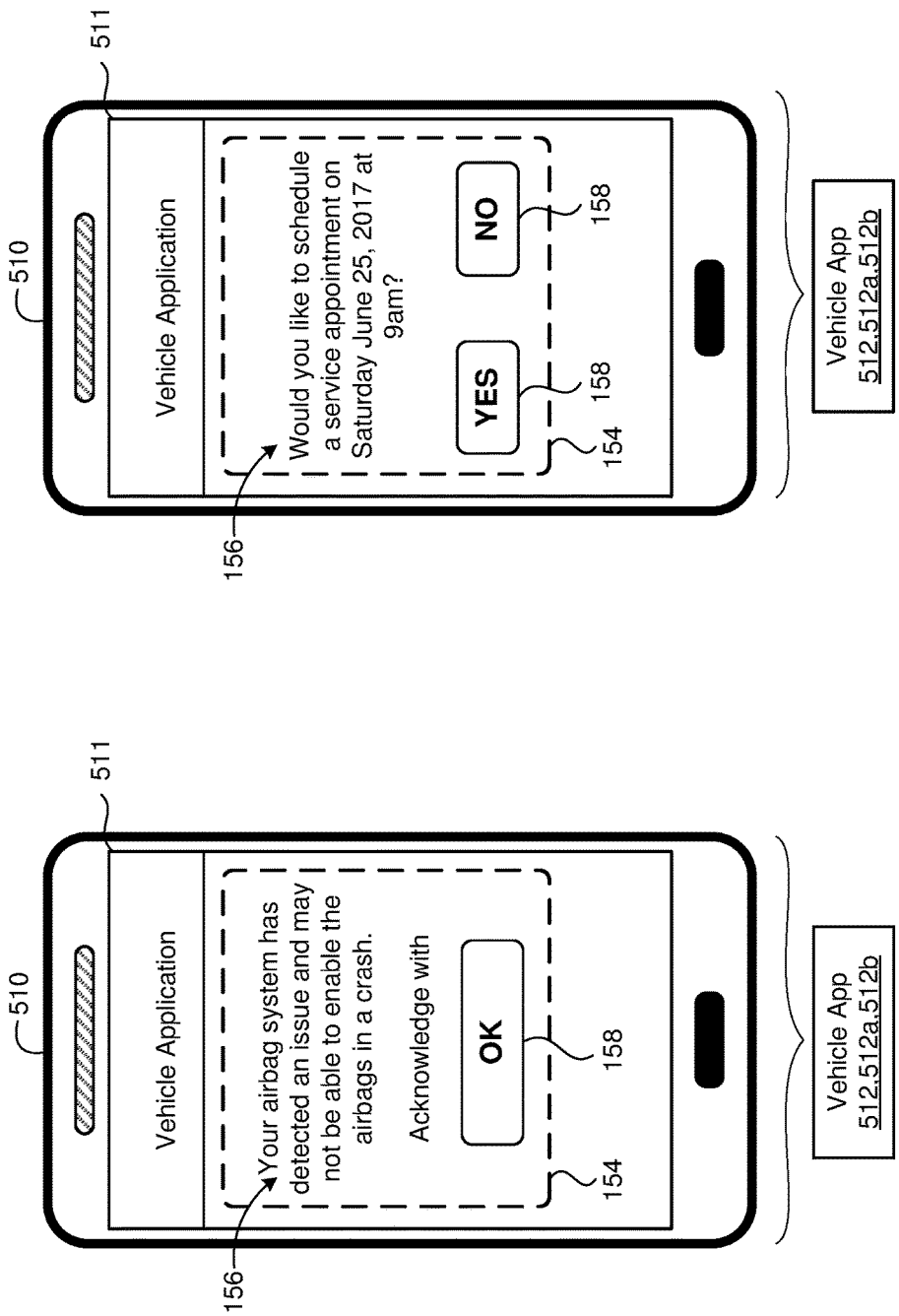
FIG. 5A is a schematic view of an exemplary user device screen displaying a fault notification message.
FIG. 5B is a schematic view of an exemplary user device screen displaying a service appointment scheduling message.

In some implementations, the user device 510 is any computing device capable of communicating with the vehicle 100. The user device 510 may include, but is not limited to, a mobile computing device, such as a laptop 510*a*, a tablet 510*b*, a smart phone 510*c* (FIGS. 5A and 5B), and a wearable computing device 510*d* (e.g., headsets and/or watches). The user device 510 may also include other computing devices having other form factors, such as a desktop computer 510*e*, a gaming device, a television, or other appliances (e.g., networked home automation devices and home appliances).

The user device 510 may use any of a variety of different operating systems. In examples where a user device 510 is a mobile device 510*b*, the user device 510 may run an operating system including, but not limited to, ANDROID® developed by Google Inc., IOS® developed by Apple Inc., or WINDOWS PHONE® developed by Microsoft Corporation. Accordingly, the operating system running on the user device 510 may include, but is not limited to, one of ANDROID®, IOS®, or WINDOWS PHONE®. In an example where a user device 510 is a laptop or desktop computing device, the user device may run an operating system including, but not limited to, MICROSOFT WINDOWS® by Microsoft Corporation, MAC OS® by Apple, Inc., or Linux.

In some examples, the user device 510 runs a vehicle software application 512 for communicating with the vehicle 100. The vehicle application 512 may be a native vehicle application 512*a* that is dedicated to interfacing with the vehicle 100; while in other examples, the user device 510 communicates with the vehicle 100 using a more general application 512*b* such as a web-browser application accessed using a web browser. A software application (i.e., a software resource 110*s*) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

In some implementations, the notification controller 300 communicates with the user device 510 via the network 530, e.g., by way of the vehicle application 512, 512*a*, 512*b*. As such, the notification controller 300 transmits the notification message 156 for display on a display of the user device 510, as shown in FIG. 5A. The vehicle application 512, 512*a*, 512*b* allows for interaction between the user device 510 and the driver 502; therefore, the driver 502 can confirm the receipt of the notification message 156 using the user device 510. The confirmation is then transmitted via the network 530 to the notification controller 300. As previously described, the notification controller 300 is supported by the vehicle body 110. However, in some examples, the notification controller 300 may be executed on the remote system 520 and communicated with the vehicle 100 and the user device 510 via the network 530.

In some implementations, the notification controller 300 is in communication with a third party 540, e.g., a preferred dealer or service garage, via the network 530. The notification controller 300 may send the fault message 156 to the third party 540 in addition to the user interface 170. Therefore, the third party 540 may receive one or more fault notifications 156 from multiple vehicles 100. The third party 540 may then contact the driver 502, e.g., via email or phone call, and schedule an appointment for the vehicle 100 to be serviced.

Referring to FIG. 5B, in some implementations, the vehicle application 512, 512*a*, 512*b* has access to a driver calendar associated with the user device 510 and a third party calendar associated with a third party 540, e.g., a preferred dealer or service garage. When the vehicle application 512, 512*a*, 512*b* receives the warning message 156, the vehicle application 512, 512*a*, 512*b* may display the message 156 and also notify the driver 502 of a date and time frame where the driver 502 does not have any other plans on his calendar and the third party 540 can take the vehicle 100 for repairs.

Notification Controller for Vehicle Fleet Management

Figure 6:
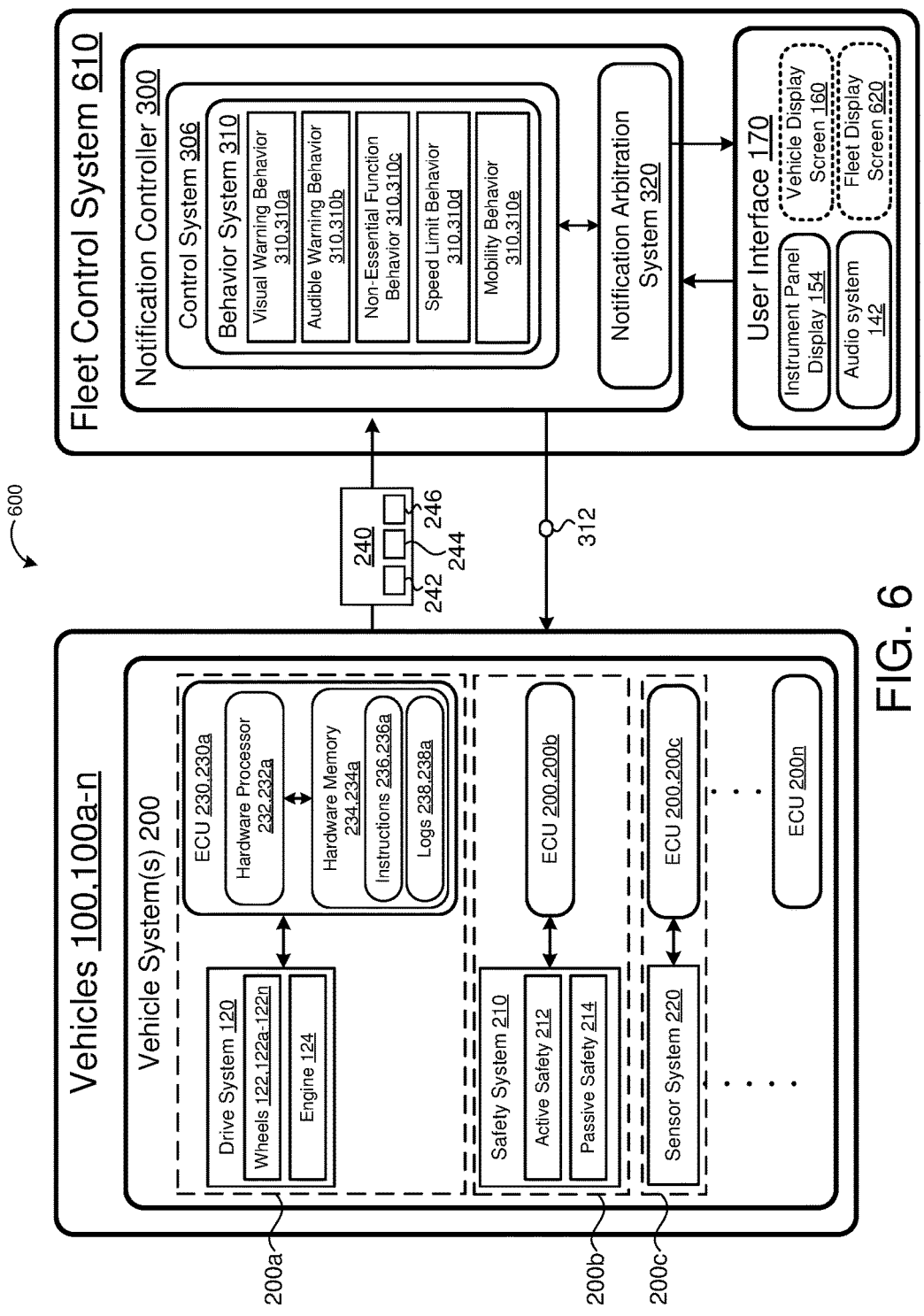
FIG. 6 is a schematic view of an exemplary vehicle notification system associated with a fleet of vehicles.

Referring to FIG. 6, in some implementations, the notification controller 300 may be configured to monitor the faults of one or more vehicles 100, 100*a*-*n* within a fleet. A fleet management system 600 includes one or more vehicles 100, 100*a*-*n*, where each vehicle 100, 100*a*-*n* includes vehicle system(s) 200, 200*a*-*n* as described with respect to FIG. 2. Each vehicle 100, 100*a*-*n* is in communication with a fleet control system 610 via the network 430, where the fleet control system 610 includes the notification controller 300. When a fault associated with a vehicle 100, 100*a*-*n* occurs, the vehicle 100, 100*a*-*n* transmits a fault signal 240 that includes fault data 242, 244, 246 to the fleet control system 610. When the fleet control system 610 receives the fault data 242, 244, 246 then the notification controller 300 determines which behavior 310*a*-310*e* to execute and once executed, the fault message 156 is displayed on both the instrument panel display 154 associated with the vehicle 100, 100*a*-*n* and a fleet display screen 620. A fleet manager (not shown) may monitor the faults associated with the vehicle 100, 100*a*-*n* and schedule service appointments for a vehicle 100, 100*a*-*n* having a fault. As such, the vehicles 100, 100*a*-*n* are maintained and the number of on the road vehicle breakdowns is reduced.

Figure 7:
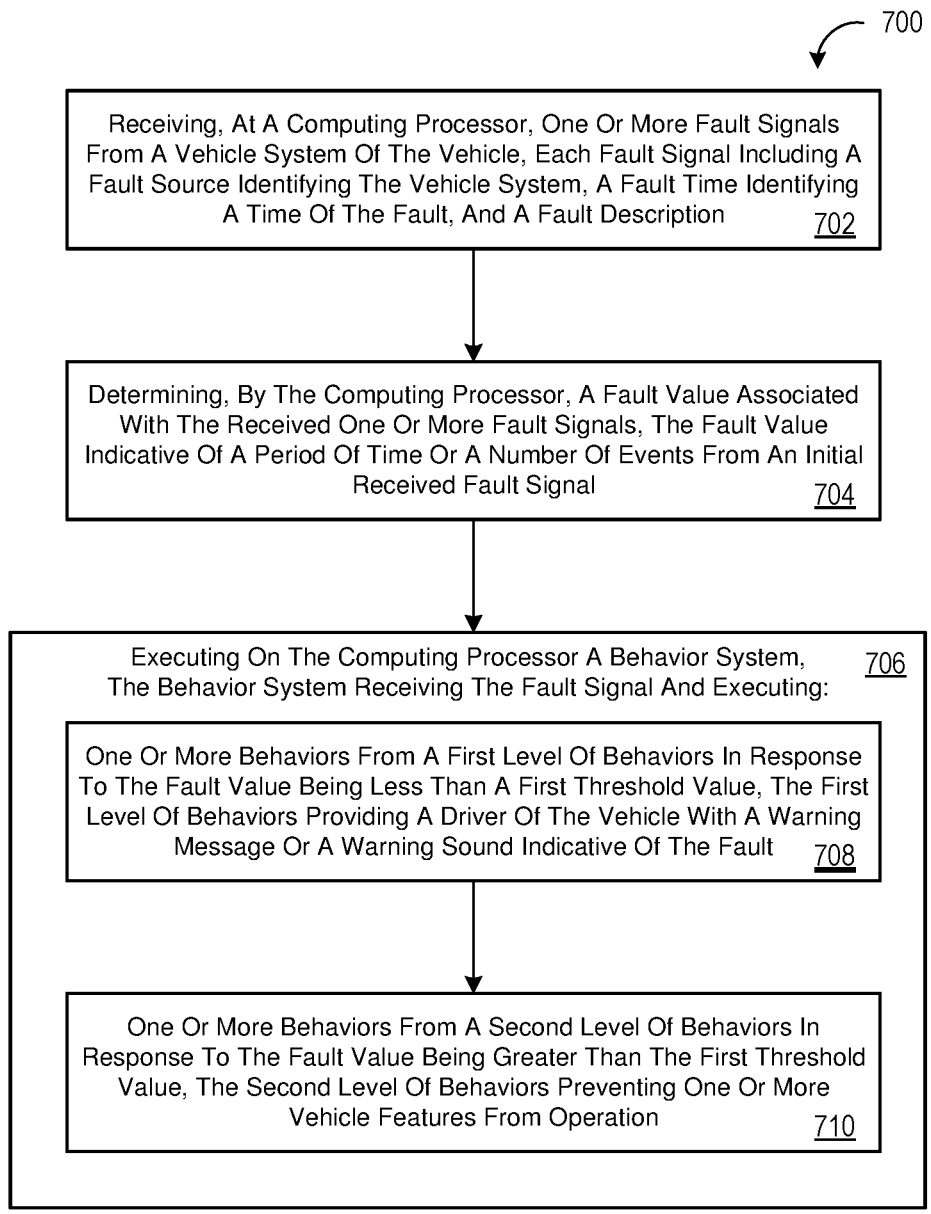
FIG. 7 is a schematic view of an exemplary arrangement of operations for a method of notifying a driver of a vehicle fault.

FIG. 7 provides an exemplary arrangement of operations for a method 700 of notifying a driver of a vehicle system fault using the vehicle notification controller 300 (having a computing processor 302 and hardware memory 304) described in FIGS. 1-6.

At block 702, the method 700 includes receiving, at a computing processor 302, one or more fault signals 240 from a vehicle system 200, 200*a*-*n* of a vehicle 100. Each fault signal 240 includes a fault source 242 identifying the vehicle system 200 associated with the fault, 200*a*-*n*, a fault time 244 identifying a time of the fault, and a fault description 246.

At block 704, the method 700 includes determining, by the computing processor 302, a fault value $F_V$ associated with the received one or more fault signals 240. The fault value $F_V$ indicative of a period of time or a number of events from an initial received fault signal 240.

At block 706, the method 700 includes executing on the computing processor 302 a behavior system 310. The behavior system 310 receives the fault signal 240 and executes, at block 708, one or more behaviors 310, 310*a*-*e* from a first level of behaviors in response to the fault value $F_V$ being less than a first threshold value $T_1$, and at block 710 one or more behaviors 310, 310a-e from a second level of behaviors in response to the fault value $F_V$ being greater than the first threshold value $T_2$. The first level of behaviors provides a driver of the vehicle 100 with a warning message 156 or a warning sound indicative of the fault, and the second level of behaviors prevents one or more vehicle features from operation.

In some examples, the method 700 further includes storing, at hardware memory 304 in communication with the computing processor 302, the received fault signal 240. In addition, when a received fault signal 240 is received at a first time followed by a received fault signal 240 received at a second time, the method 700 includes adjusting the fault value $F_V$ to include the received fault signal 240 received at the second time.

The method may also include resetting the fault value $F_V$ associated with a received fault signal 240, when the received signal is not received after a vehicle power cycle. When executing the one or more behaviors 310, 310a-e from the first level of behaviors, the method 700 includes: sending, from the computing processor 302 to a user interface 170 in communication with the computing processor 302, a notification message 156 (e.g., a text message) configured for display on a display of the user interface 170; and receiving an acknowledgment 158 from a driver by way of the user interface 170 indicative of a confirmation of receipt of the text message 156. The user interface 170 may be one or more of an instrument panel display 154 or a display screen 160 of the vehicle 100, a user device display 511, and a fleet display screen 620.

In some implementations, when executing the one or more behaviors from the first level of behaviors, the method 700 also includes sending, from the computing processor 302 to an audio system 142 in communication with the computing processor 302, a sound signal or a text-to-speech signal configured to be outputted from one or more speakers of the audio system and indicative of a notice of the identified fault.

The one or more behaviors 310, 310a-e from the second level of behaviors are in response to the fault value $F_V$ being greater than the first threshold value $T_1$ and less than a second threshold $T_2$ value being greater than the first threshold value $T_1$. The second level of behaviors prevents one or more non-essential features from operation. For example, the non-essential vehicle features or functions may include, but are not limited to, radio function, navigation function, air conditioning functions, heated and/or cooled seats, sun roof and moon roof, limitation of range of travel or speed of travel for a given key cycle, continuous audible and/or visual warning, and a wait time before a driver can shift the vehicle out of a park position. In some implementations, the behavior system 310 further executes one or more behaviors 310, 310a-e from a third level of behaviors in response to the fault value $F_V$ being greater than the second threshold value $T_2$, where the third level of behaviors prevents the vehicle from being driven.

In some examples, the vehicle system 200 includes at least one of a drive system 120, 200a, a safety system 200b, 210, and a sensor system 200c, 220. Other vehicle systems 200d-n may also be included. The vehicle 100 includes a vehicle body 110 that defines a forward drive direction F. The vehicle system 200 is supported by the vehicle body 110. In some examples, the vehicle system 200 includes an electronic control unit (ECU) 230, 230a-n configured to detect a fault associated with the vehicle system 200, 200a-n and transmits the fault signal 240 to the computing processor 302.

In some implementations, the computing processor 302 is in communication with a user device 510 via a network 530. The user device 510 configured to receive the one or more behaviors 310, 310a-e from the first level of behaviors in response to the fault value $F_V$ being less than the first threshold value $T_1$.

Computing Device

Figure 8:
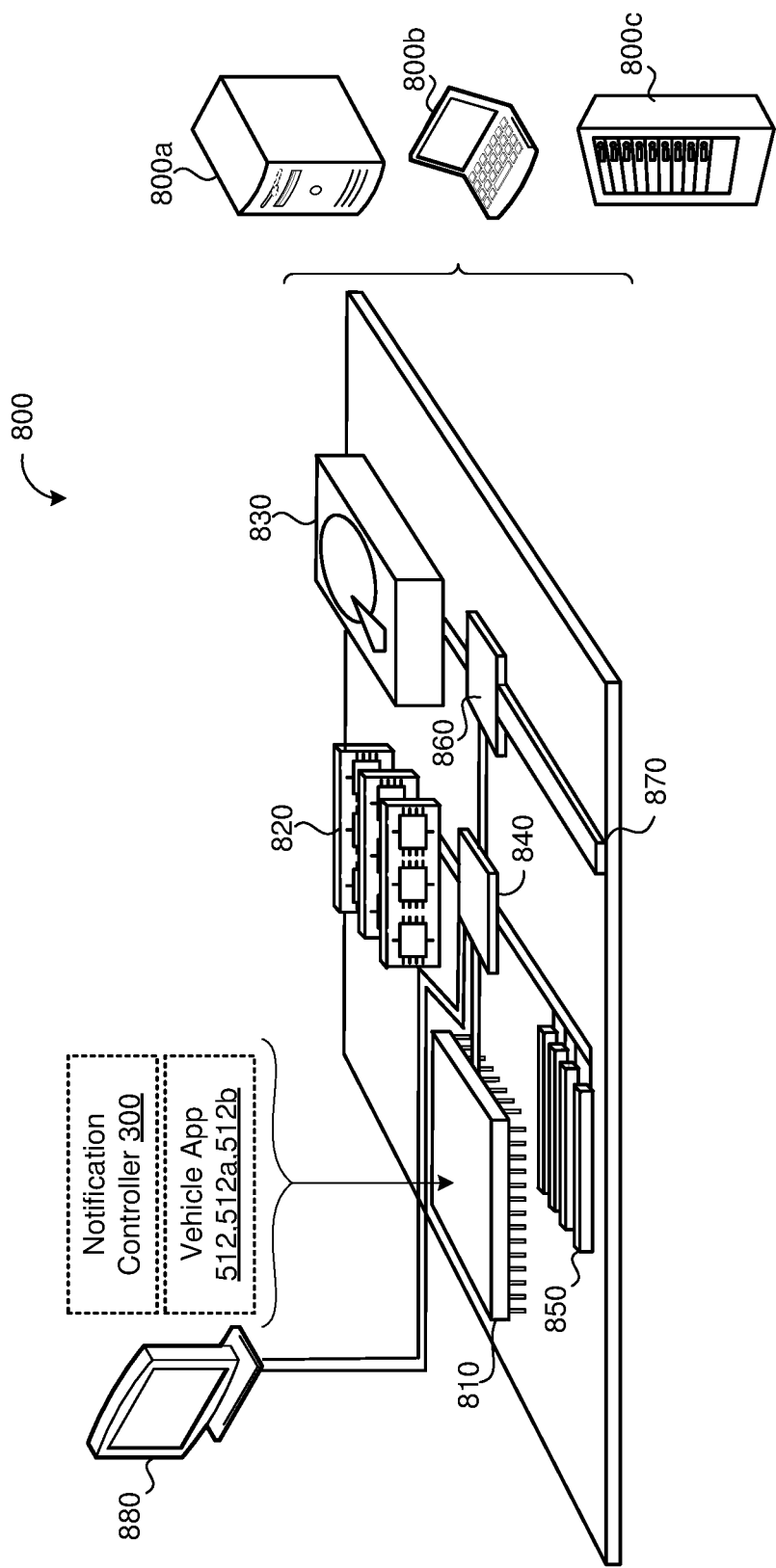
FIG. 8 is a schematic view of an example computing device executing any system or methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to low speed bus 870 and storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of notifying a driver of a fault associated with a vehicle system of a vehicle, the method comprising:
   receiving, at a computing processor, one or more fault signals from a vehicle system of the vehicle, each fault signal including a fault source identifying the vehicle system, a fault time identifying a time of the fault, and a fault description;
   determining, by the computing processor, a fault value associated with the received one or more fault signals, the fault value indicative of a period of time or a number of events from an initial received fault signal;
   executing on the computing processor a behavior system, the behavior system receiving the fault signal and executing:
      one or more behaviors from a first level of behaviors in response to the fault value being less than a first threshold value, the first level of behaviors providing a driver of the vehicle with a warning message or a warning sound indicative of the fault; and
      one or more behaviors from a second level of behaviors in response to the fault value being greater than the first threshold value, the second level of behaviors preventing one or more vehicle features from operating; and
   resetting the fault value associated with the received fault signal, when after a vehicle power cycle the received fault signal is not subsequently received.

2. The method of notifying the driver of a fault of claim 1, further comprising:
   storing, at hardware memory in communication with the computing processer, the received fault signal; and
   when a received fault signal is received at a first time followed by a received fault signal received at a second time, adjusting the fault value to include the received fault signal received at the second time.

3. The method of notifying the driver of a fault of claim 1, further comprising, when executing the one or more behaviors from the first level of behaviors:
   sending, from the computing processor to a user interface in communication with the computing processor, a text message configured for display on a display of the user interface; and
   receiving an acknowledgment from a driver by way of the user interface indicative of a confirmation of receipt of the text message.

4. The method of notifying the driver of a fault of claim 1, further comprising, when executing the one or more behaviors from the first level of behaviors:

sending, from the computing processor to an audio system in communication with the computing processor, a sound signal or a text-to-speech signal configured to be outputted from one or more speakers of the audio system and indicative of a notice of the identified fault.

5. The method of notifying the driver of a fault of claim 1, wherein the one or more behaviors from the second level of behaviors are in response to the fault value being greater than the first threshold value and less than a second threshold value being greater than the first threshold value, the second level of behaviors preventing one or more non-essential features from operation.

6. The method of notifying the driver of a fault of claim 5, wherein the one or more non-essential features include at least one of infotainment system, limitation of range of travel or speed of travel for a given key cycle, continuous audible and/or visual warning, and a wait time before a driver can shift the vehicle out of a park position.

7. The method of notifying the driver of a fault of claim 5, wherein the behavior system further executes:
one or more behaviors from a third level of behaviors in response to the fault value being greater than the second threshold value, the third level of behaviors preventing the vehicle from being driven.

8. The method of notifying the driver of a fault of claim 1, wherein the vehicle system includes at least one of a drive system, a safety system, and a sensor system.

9. The method of notifying the driver of a fault of claim 8, wherein the vehicle comprises a vehicle body defining a forward drive direction, the vehicle system is supported by the vehicle body.

10. The method of notifying the driver of a fault of claim 9, wherein the vehicle system comprises an electronic control unit configured to detect a fault associated with the vehicle system and transmits a fault signal to the computing processor.

11. The method of notifying the driver of a fault of claim 1, wherein the computing processor is in communication with a user device via a network, the user device configured to receive the one or more behaviors from the first level of behaviors in response to the fault value being less than a first threshold value.

12. A vehicle notification system comprising:
hardware memory;
a behavior system executing on a data processing device in communication with hardware memory, the behavior system:
receiving one or more fault signals from a vehicle system of a vehicle, each fault signal including a fault source identifying the vehicle system, a fault time identifying a time of the fault, and a fault description;
storing, at the hardware memory, the one or more received fault signal;
determining a fault value associated with the one or more received fault signals, the fault value indicative of a period of time or a number of events from an initial received fault signal;
executing one or more behaviors from a first level of behaviors in response to the fault value being less than a first threshold value, the first level of behaviors providing a driver of the vehicle with a warning message or a warning sound indicative of the fault;
executing one or more behaviors from a second level of behaviors in response to the fault value being greater than the first threshold value, the second level of behaviors preventing one or more vehicle features from operation; and
resetting the fault value associated with the received fault signal, when after a vehicle power cycle the received fault signal is not subsequently received.

13. The vehicle notification system of claim 12, wherein the one or more behaviors from the second level of behaviors are in response to the fault value being greater than the first threshold value and less than a second threshold value being greater than the first threshold value, the second level of behaviors preventing one or more non-essential features from operation.

14. The vehicle notification system of claim 13, wherein the one or more non-essential features include at least one of infotainment system, limitation of range of travel or speed of travel for a given key cycle, continuous audible and/or visual warning, and a wait time before a driver can shift the vehicle out of a park position.

15. The vehicle notification system of claim 13, wherein the behavior system further executes one or more behaviors from a third level of behaviors in response to the fault value being greater than the second threshold value, the third level of behaviors preventing the vehicle from being driven.

16. The vehicle notification system of claim 12, wherein when a received fault signal is received at a first time followed by a received fault signal received at a second time, the behavior system adjusts the fault value to include the received fault signal received at the second time.

17. The vehicle notification system of claim 12, wherein when executing the one or more behaviors from the first level of behaviors:
sending, from the data processing device to an audio system in communication with the data processing device, a sound signal or a text-to-speech signal configured to be outputted from one or more speakers of the audio system and indicative of a notice of the identified fault.

18. The vehicle notification system of claim 12, wherein the data processing device is in communication with a user device via a network, the user device configured to receive the one or more behaviors from the first level of behaviors in response to the fault value being less than the first threshold value.

19. A method of notifying a driver of a fault associated with a vehicle system of a vehicle, the method comprising:
receiving, at a computing processor, one or more fault signals from a vehicle system of the vehicle, each fault signal including a fault source identifying the vehicle system, a fault time identifying a time of the fault, and a fault description;
determining, by the computing processor, a fault value associated with the received one or more fault signals, the fault value indicative of a period of time or a number of events from an initial received fault signal;
executing on the computing processor a behavior system, the behavior system receiving the fault signal and executing:
one or more behaviors from a first level of behaviors in response to the fault value being less than a first threshold value, the first level of behaviors providing a driver of the vehicle with a warning message or a warning sound indicative of the fault; and
one or more behaviors from a second level of behaviors in response to the fault value being greater than the first threshold value and less than a second threshold value being greater than the first threshold value, the second level of behaviors preventing one or more non-essential features from operating, the one or more non-essential features include at least one of infotainment system, limitation of range of travel or speed of travel for a given key cycle, continuous audible and/or visual warning, and a wait time before a driver can shift the vehicle out of a park position.

20. A vehicle notification system comprising:
hardware memory;
a behavior system executing on a data processing device in communication with hardware memory, the behavior system:
receiving one or more fault signals from a vehicle system of a vehicle, each fault signal including a fault source identifying the vehicle system, a fault time identifying a time of the fault, and a fault description;
storing, at the hardware memory, the one or more received fault signal;
determining a fault value associated with the one or more received fault signals, the fault value indicative of a period of time or a number of events from an initial received fault signal;
executing one or more behaviors from a first level of behaviors in response to the fault value being less than a first threshold value, the first level of behaviors providing a driver of the vehicle with a warning message or a warning sound indicative of the fault; and
executing one or more behaviors from a second level of behaviors in response to the fault value being greater than the first threshold value and less than a second threshold value being greater than the first threshold value, the second level of behaviors preventing one or more non-essential features from operating, the one or more non-essential features include at least one of infotainment system, limitation of range of travel or speed of travel for a given key cycle, continuous audible and/or visual warning, and a wait time before a driver can shift the vehicle out of a park position.

* * * * *